US010964493B2

(12) United States Patent
Omori et al.

(10) Patent No.: US 10,964,493 B2
(45) Date of Patent: Mar. 30, 2021

(54) ARC-QUENCHING DEVICE FOR DIRECT CURRENT SWITCH

(71) Applicant: Omron Corporation, Kyoto (JP)

(72) Inventors: Koji Omori, Okayama (JP); Makito Morii, Okayama (JP); Hiroyuki Otsuka, Okayama (JP)

(73) Assignee: Omron Corporation, Kyoto (JP)

( * ) Notice: Subject to any disclaimer, the term of this patent is extended or adjusted under 35 U.S.C. 154(b) by 112 days.

(21) Appl. No.: 16/347,363

(22) PCT Filed: Oct. 20, 2017

(86) PCT No.: PCT/JP2017/038013
§ 371 (c)(1),
(2) Date: May 3, 2019

(87) PCT Pub. No.: WO2018/131249
PCT Pub. Date: Jul. 19, 2018

(65) Prior Publication Data
US 2019/0287742 A1  Sep. 19, 2019

(30) Foreign Application Priority Data

Jan. 13, 2017 (JP) .............................. JP2017-004387

(51) Int. Cl.
*H01H 9/54* (2006.01)
*H01H 33/59* (2006.01)
*H02P 7/06* (2006.01)

(52) U.S. Cl.
CPC .............. *H01H 9/542* (2013.01); *H01H 9/54* (2013.01); *H01H 9/547* (2013.01); *H01H 33/59* (2013.01); *H02P 7/06* (2013.01)

(58) Field of Classification Search
CPC ........ H01H 9/541; H01H 9/542; H01H 9/547; H01H 33/59; H01H 9/30; H01H 33/00;
(Continued)

(56) References Cited

U.S. PATENT DOCUMENTS 3,868,549 A * 2/1975 Schaefer ................. H01H 9/542
361/13
5,652,688 A * 7/1997 Lee ......................... H01H 9/542
361/13
(Continued)

FOREIGN PATENT DOCUMENTS

CN 105185623 A 12/2015
EP 3259816 B1 4/2019
(Continued)

OTHER PUBLICATIONS

Office Action issued in the counterpart Korean Patent Application No. 10-2019-7012353, dated May 21, 2020 (20 pages).
(Continued)

Primary Examiner — Adolf D Berhane
(74) Attorney, Agent, or Firm — Osha Bergman Watanabe & Burton LLP

(57) ABSTRACT

An arc quenching device, which prevents a load device from displaying an unnecessary behavior during starting of a power supply, includes: a semiconductor switch connected in parallel to a first switch which is mechanical; a power supply circuit configured to use a voltage which is generated between both contact points of the first switch to output a voltage which causes the semiconductor switch to turn on; and a second switch configured to cause its open state to prevent the semiconductor switch from turning on.

10 Claims, 6 Drawing Sheets

(58) Field of Classification Search
CPC .......... H01H 33/04; H01H 33/16; H01H 9/54; H02P 7/06
See application file for complete search history.

(56) References Cited

U.S. PATENT DOCUMENTS

| | | | |
|---|---|---|---|
| 9,621,064 B2* | 4/2017 | Yuzurihara | ......... H02M 3/1582 |
| 2019/0279830 A1* | 9/2019 | Omori | ..................... H01H 9/30 |

FOREIGN PATENT DOCUMENTS

| | | |
|---|---|---|
| JP | S61-259416 A | 11/1986 |
| JP | H08-106839 A | 4/1996 |
| JP | 3441813 B2 | 9/2003 |
| KR | 1020110058846 A | 6/2011 |
| KR | 1020130109879 A | 10/2013 |
| WO | 2010/035082 A2 | 4/2010 |

OTHER PUBLICATIONS

International Search Report issued in Application No. PCT/JP2017/038013, dated Nov. 14, 2017 (1 page).
Written Opinion issued in International Application No. PCT/JP2017/038013, dated Nov. 14, 2017 (6 pages).
Office Action issued in the counterpart Chinese Patent Application No: 201780067170.3, dated Jan. 10, 2020 (11 pages).
Office Action issued in German Application No. 11 2017 006 814.2, dated Dec. 18 2020 (9 pages).

\* cited by examiner

ARC-QUENCHING DEVICE FOR DIRECT CURRENT SWITCH

TECHNICAL FIELD

The present invention relates to a direct current switch arc quenching device configured to quench an arc which occurs between contact points of a direct current switch.

BACKGROUND ART

An arc quenching device configured to quench an arc which occurs in a direct current switch is conventionally known. As disclosed in, for example, Patent Literature 1, an arc quenching device is connected in parallel to a direct current switch and configured to quench an arc which occurs between contact points of the direct current switch.

The arc quenching device disclosed in Patent Literature 1 specifically includes a direct current power supply, a mechanical switch, a semiconductor switch, a power supply circuit, a control circuit, and a timing circuit. The mechanical switch is connected in series to the direct current power supply. The semiconductor switch is connected in parallel to the mechanical switch. The control circuit turns on and off the semiconductor switch. The power supply circuit drives the control circuit. The timing circuit is (i) connected between (a) one of contact points of the mechanical switch and (b) the power supply circuit and (ii) configured to set a time of operation of the power supply circuit. The arc quenching device which is thus configured uses a voltage of an arc which occurs in the mechanical switch to turn on the semiconductor switch so as to quench the arc.

CITATION LIST

Patent Literature

[Patent Literature 1]
Japanese Patent No. 3441813

SUMMARY OF INVENTION

Technical Problem

Note, however, Patent Literature 1 discloses a circuit configuration such that (i) an arc quenching circuit including (a) the mechanical switch, (b) the semiconductor switch, and (c) the timing circuit and (ii) a load are always connected with the direct current power supply. Thus, also in a case where the mechanical switch is in an open state, during starting of the direct current power supply, e.g., in the case of mounting of the direct current power supply, a voltage is supplied to the control circuit via the timing circuit and the power supply circuit, so that the control circuit operates. This causes the semiconductor switch to turn on for a short time, during which an electric current flows to a main circuit including the load. Thus, for example, an electric power tool, which is a load device, has a problem of (i) displaying a behavior which is unintended by a user and (ii) causing the user to be suspicious about reliability of the electric power tool.

In view of the above, an aspect of the present invention has an object to provide an arc quenching device configured to prevent a load device from displaying an unnecessary behavior during starting of a power supply.

Solution to Problem

An arc quenching device in accordance with an aspect of the present invention which arc quenching device is configured to quench an arc which occurs in a direct current switch includes: a semiconductor switch connected in parallel to a first switch which is mechanical and is connected in series to a direct current power supply of a load device; a power supply circuit connected to each of both contact points of the first switch and configured to use a voltage which is generated between the both contact points in response to opening of the first switch to output a voltage which causes the semiconductor switch to turn on; and a second switch configured to cause its open state to prevent the semiconductor switch from turning on.

Advantageous Effects of Invention

According to an aspect of the present invention, the second switch is configured to cause its open state to prevent the semiconductor switch from turning on. Thus, no pulse electric current flows to the load device via the semiconductor switch also in a case where a user detaches the direct current power supply from the load device (e.g., an electric power tool) and then attaches the direct current power supply to the load device. This (i) prevents the load device from displaying a behavior which is unexpected by the user and (ii) allows the arc quenching device to prevent the load device from displaying an unnecessary behavior during starting of the direct current power supply.

DESCRIPTION OF EMBODIMENTS

Embodiment 1

Figure 1:
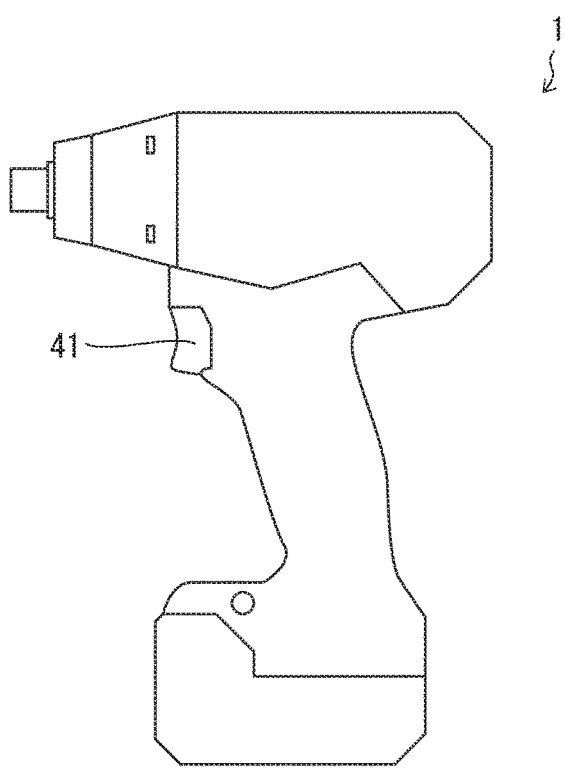
FIG. 1 is a front view showing an example of an electric power tool, which is a load device including an arc quenching device of an embodiment of the present invention.
Figure 2:
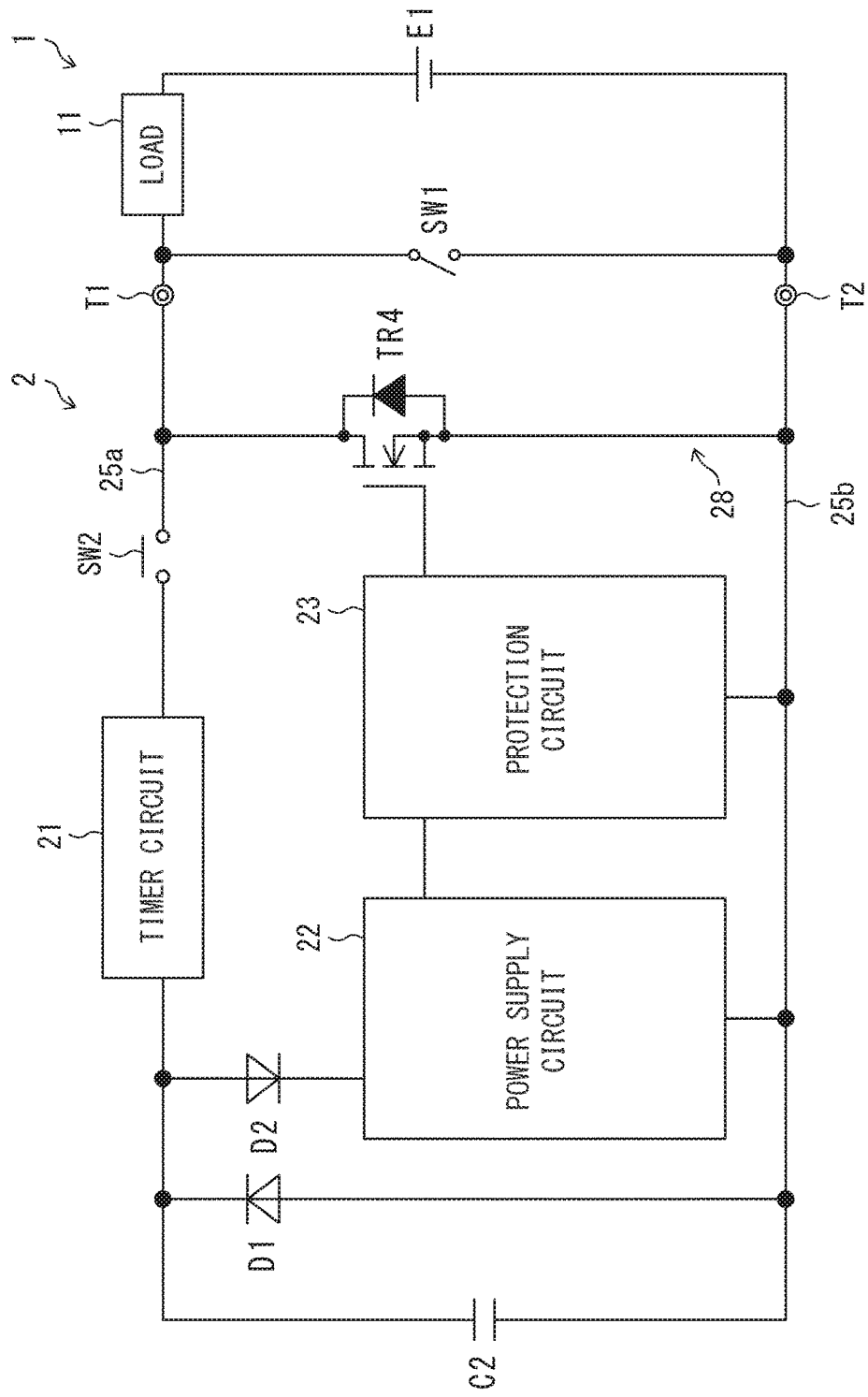
FIG. 2 is a block diagram illustrating a state in which the arc quenching device of an embodiment of the present invention is connected to a load device.

An embodiment of the present invention is described below with reference to the drawings. FIG. 1 is a front view showing an example of an electric power tool, which is a load device including an arc quenching device of Embodiment 1. FIG. 2 is a block diagram illustrating a state in which the arc quenching device of Embodiment 1 is connected to a load device. The description of Embodiment 1 takes, as an example, a case where (i) a load device is, for example, a portable electric power tool illustrated in FIG. 1 and (ii) an arc quenching device is incorporated in the load device.

(Configuration of Load Device 1)

As illustrated in FIG. 2, a load device 1 includes a direct current power supply E1, a load 11, and a first switch (direct current switch) SW1 which are connected in series so as to configure a closed loop. The direct current power supply E1 is, for example, a battery. The load 11 is, for example, a motor. The first switch SW1 is a mechanical contact switch which has contact points.

(Configuration of Arc Quenching Device 2)

An arc quenching device 2 includes a semiconductor switch TR4, a first timer circuit 21, a power supply circuit 22, a protection circuit 23, and a second switch SW2.

According to Embodiment 1, the semiconductor switch TR4 is a field effect transistor (FET) and has (i) a drain which is connected to a first electrically conducted path 25a located on a positive side and (ii) a source which is connected to a second electrically conducted path 25b located on a negative side. The first electrically conducted path 25a is connected to a positive side connection terminal T1, and the positive side connection terminal T1 is connected to one of terminals of the first switch SW1. The second electrically conducted path 25b is connected to a negative side connection terminal T2, and the negative side connection terminal T2 is connected to the other of the terminals of the first switch SW1. A circuit which leads from the positive side connection terminal T1 through the semiconductor switch TR4 to the negative side connection terminal T2 is a bypass circuit 28 with respect to the first switch SW1, and the semiconductor switch TR4 is connected in parallel to the first switch SW1.

The power supply circuit 22 is connected to each of the first electrically conducted path 25a and the second electrically conducted path 25b. The power supply circuit 22 and the first electrically conducted path 25a are connected via a diode D2 in which a direction in which an electric current flows from the first electrically conducted path 25a to the power supply circuit 22 is a forward direction. The power supply circuit 22 is a constant voltage circuit which is supplied with electric power from each of the first electrically conducted path 25a and the second electrically conducted path 25b and supplies a fixed voltage to the semiconductor switch TR4.

The first timer circuit 21 is provided, on the first electrically conducted path 25a, between (a) a connection between the first electrically conducted path 25a and the semiconductor switch TR4 and (b) a connection between the first electrically conducted path 25a and the diode D2. The first timer circuit 21 interrupts the first electrically conducted path 25a after a given time has elapsed since the arc quenching device started its operation, i.e., after charging of a capacitor C1 has been finished (after the capacitor C1 is full of electric charges).

The protection circuit 23 is provided between the power supply circuit 22 and the semiconductor switch TR4 and supplies, to a gate of the semiconductor switch TR4, a voltage which is supplied from the power supply circuit 22. The protection circuit 23 protects the semiconductor switch TR4 so that no voltage that is not less than a maximum rated voltage is applied to the gate of the semiconductor switch TR4. Note that the arc quenching device 2, whose basic operation is to quench an arc, does not necessarily need to include the protection circuit 23.

The second switch SW2 is provided, for example, on the first electrically conducted path 25a, between (a) a connection between the semiconductor switch TR4 and the first electrically conducted path 25a and (b) the first timer circuit 21 so as to open and close the first electrically conducted path 25a. The second switch SW2 is a normally open switch and is exemplified by a switch having a contact point which is manually operated and automatically restored.

According to Embodiment 1, the first switch SW1 and second switch SW2 are incorporated in a trigger switch (operation section) 41 of a portable electric power tool, which is the load device 1 illustrated in FIG. 1. In this case, in response to pushing (or pulling) of the trigger switch 41, the second switch SW2 is closed first and then the first switch SW1 is closed. Contrary to the above case, during a reset of the trigger switch 41, the first switch SW1 is opened first and then the second switch SW2 is opened.

Furthermore, a diode D1 and a capacitor C2 are provided between the first electrically conducted path 25a and the second electrically conducted path 25b so as to be located on a first side of the power supply circuit 22 which first side is opposite from a second side of the power supply circuit 22 on which second side the semiconductor switch TR4 is provided. The diode D1 in which a direction in which an electric current flows from the second electrically conducted path 25b to the first electrically conducted path 25a is a forward direction is connected to each of the first electrically conducted path 25a and the second electrically conducted path 25b. The diode D1 resets the first timer circuit 21 by causing a closed loop which is formed by the first timer circuit 21, the semiconductor switch TR4, and the diode D1 to emit electric charges which have been accumulated in the first timer circuit 21. The capacitor C2 removes noise of each of the first electrically conducted path 25a and the second electrically conducted path 25b so as to stabilize a voltage between the first electrically conducted path 25a and the second electrically conducted path 25b. Note that the arc quenching device 2, whose basic operation is to quench an arc, does not necessarily need to include the capacitor C2.

(Specific Circuit of Arc Quenching Device 2)

Figure 3:
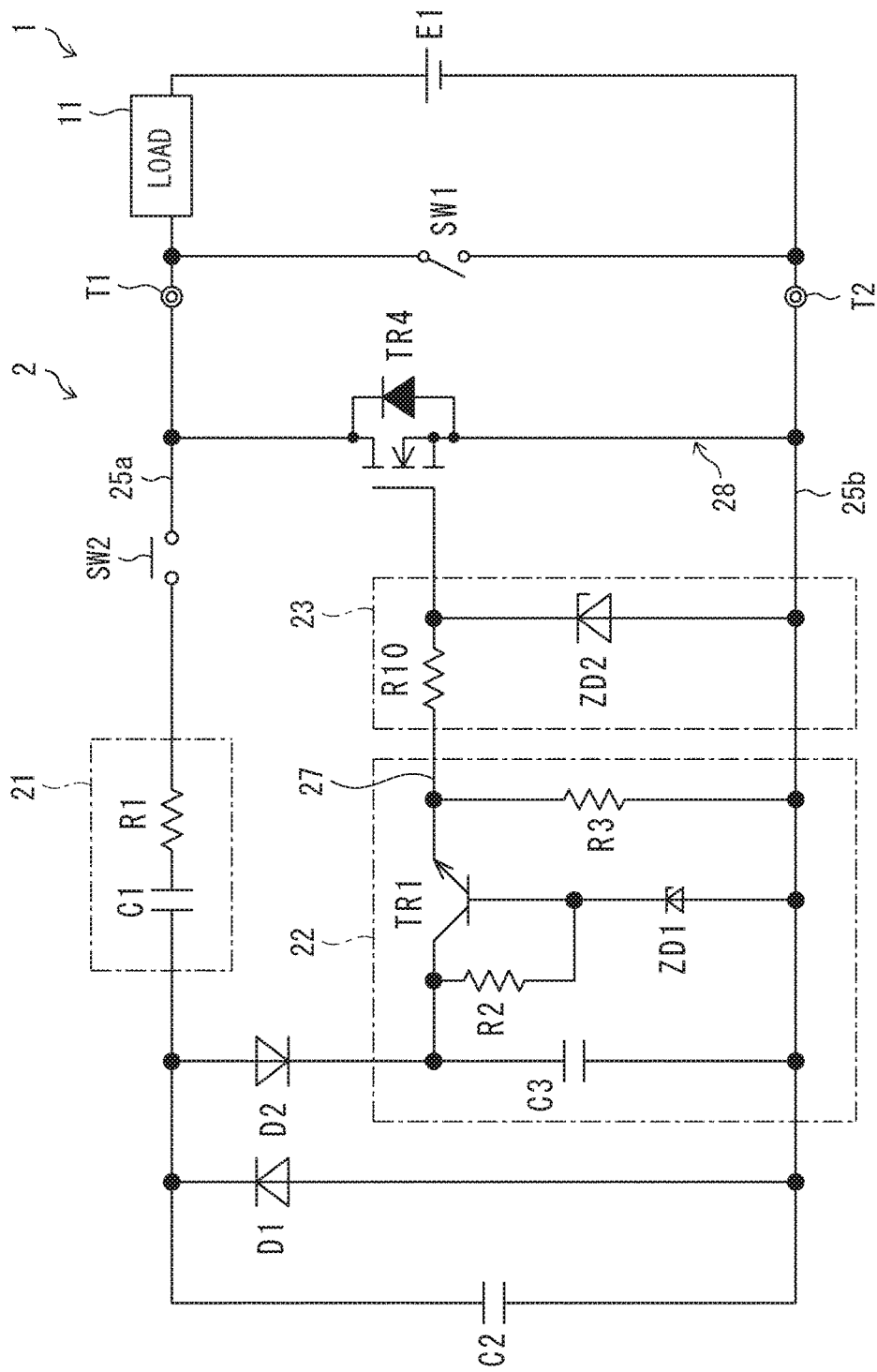
FIG. 3 is a circuit diagram of the load device and the arc quenching device each illustrated in FIG. 2.

FIG. 3 is a circuit diagram of the load device 1 and the arc quenching device 2 each illustrated in FIG. 2. As illustrated in FIG. 3, the first timer circuit 21 of the arc quenching device 2 includes the capacitor C1 and a resistor R1 which are connected in series. Note that the capacitor C1 is much larger in capacitance than a capacitor C3 of the power supply circuit 22. The resistor R1, which is a resistor having a low resistance, is preferably provided so that an excessively high electric current is prevented from flowing to a circuit. Note, however, that the arc quenching device 2, whose basic operation is to quench an arc, does not necessarily need to include the resistor R1.

The power supply circuit 22 includes a transistor TR1, the capacitor C3, and resistors R2 and R3, and a Zener diode ZD1. The transistor TR1 has an emitter which is connected to a third electrically conducted path 27 which leads from the emitter to the gate of the semiconductor switch TR4. The capacitor C3 is provided between a collector of the transistor TR1 and the second electrically conducted path 25b. The resistor R2 is provided between a base of the transistor TR1 and the collector of the transistor TR1. The Zener diode ZD1 is provided between the base of the transistor TR1 and the second electrically conducted path 25b. The resistor R3 is provided between the emitter of the transistor TR1 and the second electrically conducted path 25b. Note that the diode D2 (described earlier) has a cathode which is connected to the collector of the transistor TR1.

The protection circuit 23 includes a resistor R10 and a Zener diode ZD2. The resistor R10 is provided, on the third electrically conducted path 27, between the emitter of the transistor TR1 and the gate of the semiconductor switch TR4. The Zener diode ZD2 is provided between the gate of the semiconductor switch TR4 and the second electrically conducted path 25b. The resistor 10, which is a resistor called a gate resistance, limits an electric current which flows into a parasitic capacitance generated between a gate and a source of an FET, which is the semiconductor switch TR4.

(Operation of Arc Quenching Device 2)

The following description will discuss an operation, based on the above-described configuration, of the arc quenching device 2.

(Case where Second Switch SW2 and First Switch SW1 are Sequentially Closed)

In a case where the load device 1 and the arc quenching device 2 are in a stopped state, the first switch SW1 and the second switch SW2 are in an open state. This causes a voltage deriving from a direct current power supply E1 to be generated between the contact points of the first switch SW1.

The following description will discuss an operation which is carried out in a case where a user gradually pushes the trigger switch 41 from the above-described state in which the first switch SW1 and the second switch SW2 are in the open state in the stopped state of the load device 1 and the arc quenching device 2. In a case where a user of the load device 1 gradually pushes the trigger switch 41, the second switch SW2 is closed first, so that an electric current flows from the direct current power supply E1 of the load device 1 through the first electrically conducted path 25a to the power supply circuit 22. This causes the power supply circuit 22 to start its operation. Note that the first switch SW1 remains open in this state.

In a case where the power supply circuit 22 starts its operation, an output voltage of the power supply circuit 22 is applied to the gate of the semiconductor switch TR4 via the protection circuit 23, so that the semiconductor switch TR4 turns on. This causes the bypass circuit 28 to be in a closed state.

Specifically, after passing through the second switch SW2 and the first timer circuit 21, the electric current which flows through the first electrically conducted path 25a flows into the capacitor C3 of the power supply circuit 22 via the diode D2. This causes a base electric current to flow to the transistor TR1 of the power supply circuit 22, so that the transistor TR1 turns on. Note that a fixed voltage is applied to the base of the transistor TR1 by an operation of the Zener diode ZD1.

In a case where the transistor TR1 has turned on, a voltage which has been supplied from the power supply circuit 22 is applied to the gate of the semiconductor switch TR4, so that the semiconductor switch TR4 turns on. In a case where the semiconductor switch TR4 has turned on, a state of the bypass circuit 28 changes from an open state to the closed state.

In a case where the bypass circuit 28 is in the closed state, a low impedance is obtained between the contact points of the first switch SW1. Furthermore, an electric current flows to the load 11 of the load device 1 along a route followed by the direct current power supply E1, the load 11, the semiconductor switch TR4, and the direct current power supply E1.

After the semiconductor switch TR4 has turned on, no electric current flows from the direct current power supply E1 toward the first electrically conducted path 25a whose impedance is higher than that of the semiconductor switch TR4. Thus, the power supply circuit 22 eventually stops its operation, so that the semiconductor switch TR4 turns off. In a case where the semiconductor switch TR4 has turned off, since the first switch SW1 is in the open state, no electric current flows to the load 11, and a voltage between the contact points of the first switch SW1 is reset to a voltage of the direct current power supply direct current power supply E1.

As described earlier, in a case where the semiconductor switch TR4 has turned on and then an electric current flows to the load 11 while the semiconductor switch TR4 is on, the load device 1 displays a behavior which is unintended by the user, e.g., temporarily vibrates. Note, however, that this behavior is displayed during a process in which the user operates the load device 1 while having an intention to move the load device 1. Thus, the behavior is unsurprising to the user and thus does not matter.

Thereafter, in a case where the user further gradually pushes the trigger switch 41, the first switch SW1 is closed. This causes an electric current to flow to the load 11 along a route followed by the direct current power supply E1, the load 11, the first switch SW1, and the direct current power supply E1, so that the load 11 (load device 1) operates.

(Case where First Switch SW1 and Second Switch SW2 are Sequentially Opened)

The following description will discuss an operation which is carried out so that the trigger switch 41 is gradually reset from a state in which the second switch SW2 and the first switch SW1 are closed after the user has pushed the trigger switch 41 to the utmost limit.

In a case where the user gradually resets the trigger switch 41, the first switch SW1 is opened first. In this state, the second switch SW2 remains closed.

In a case where the first switch SW1 is opened, a voltage is generated between the contact points of the first switch SW1. The voltage which has been generated between the contact points causes the power supply circuit 22 to operate. An output voltage of the power supply circuit 22 is applied to the gate of the semiconductor switch TR4, so that the semiconductor switch TR4 turns on. This causes the bypass circuit 28 to be in the closed state and consequently restrains an arc from occurring between the contact points of the first switch SW1.

Specifically, in a case where the first switch SW1 is opened, a voltage is generated between the contact points of the first switch SW1 only for a moment. In a case where a voltage is generated between the contact points of the first switch SW1, an electric current flows from the positive side connection terminal T1, through the first electrically conducted path 25a, toward the first timer circuit 21. After passing through the first timer circuit 21, the electric current flows into the capacitor C3 of the power supply circuit 22 via the diode D2. This causes a base electric current to flow to the transistor TR1 of the power supply circuit 22, so that the transistor TR1 turns on. Note that a fixed voltage is applied to the base of the transistor TR1 by an operation of the Zener diode ZD1.

In a case where the transistor TR1 has turned on, a voltage which has been supplied from the power supply circuit 22 is applied to the gate of the semiconductor switch TR4, so that the semiconductor switch TR4 turns on. In a case where the semiconductor switch TR4 has turned on, the state of the bypass circuit 28 changes from the open state to the closed state. Thus, all electric currents flow to the bypass circuit 28 while no electric current flows between the contact points of the first switch SW1. This restrains an arc from occurring between the contact points of the first switch SW1.

In a case where the bypass circuit 28 is in the closed state, a low impedance is obtained between the contact points of the first switch SW1. An electric current continues to flow also to the load 11 of the load device 1.

Thereafter, in a case where the flow of the electric current through the first electrically conducted path 25a has been stopped, the power supply circuit 22 stops its operation, so that the semiconductor switch TR4 turns off. This causes the bypass circuit 28 to be in the open state. In a case where the semiconductor switch TR4 has turned off, since the first switch SW1 is in the open state, no electric current flows to the load 11, and a voltage between the contact points of the first switch SW1 is reset to a voltage of the direct current power supply E1.

In a case where charging of the capacitor C1 of the first timer circuit 21 has been finished, the first electrically conducted path 25a is interrupted by the first timer circuit 21. This causes the arc quenching device 2 to be in a stable state while being electrically separated from the load device 1, i.e., the direct current power supply E1.

In a case where the trigger switch 41 is further gradually reset, the second switch SW2 is opened.

Note here that in a state in which the user does not operate the trigger switch 41 of the electric power tool, which is the load device 1, the second switch SW2 is in the open state and the first electrically conducted path 25a is interrupted. Thus, also in a case where the user detaches the direct current power supply E1 (e.g., a storage battery) from the electric power tool and then attaches the direct current power supply E1 to the electric power tool, the load device 1 generates no pulse electric current, the semiconductor switch TR4 does not turn on, and no pulse electric current flows to the load 11. This prevents the electric power tool from displaying a behavior which is unexpected by the user.

(Advantage Brought by Arc Quenching Device 2 Including Second Switch SW2)

As described above, in the state in which the user does not operate the trigger switch 41 of the electric power tool, which is the load device 1, the first electrically conducted path 25a is interrupted by the second switch SW2. Thus, also in a case where the user detaches the direct current power supply E1 from the electric power tool and then attaches the direct current power supply E1 to the electric power tool, no pulse electric current flows to the load 11. This (i) prevents the electric power tool from displaying a behavior which is unexpected by the user and (ii) allows the arc quenching device 2 to prevent the load device 1 from displaying an unnecessary behavior during starting of a power supply (the direct current power supply E1).

According to Embodiment 1, the power supply circuit 22 is a constant voltage circuit. Note, however, that the constant voltage circuit can be replaced with a power supply circuit which drives the semiconductor switch TR4 by a simple configuration. Such a power supply circuit is obtained by omitting, for example, the transistor TR1, the resistor R2, and the Zener diode ZD1 from the power supply circuit 22.

The description of Embodiment 1 has taken, as an example, a case where the semiconductor switch TR4 serving as a switching element is an FET. Note, however, that examples of the semiconductor switch TR4 include not only an FET but also an insulated gate bipolar transistor (IGBT) and other power transistors. This point also applies to other embodiments to be described below.

Furthermore, the first timer circuit 21 has a function of stopping an operation of the power supply circuit 22 as described earlier by electrically separating the arc quenching device 2 from the load device 1 after the semiconductor switch TR4 has turned off. The function allows the first timer circuit 21 to prevent electric power of the direct current power supply E1 of the load device 1 from being continuously consumed by the arc quenching device 2. This allows the arc quenching device 2 to include, instead of the first timer circuit 21 which includes the resistor R1 and the capacitor C1, a circuit which causes the arc quenching device 2 (in particular, the power supply circuit 22) to be electrically separated from the load device 1 after the semiconductor switch TR4 has turned off. This point also applies to other embodiments.

Embodiment 2

Another embodiment of the present invention is described below with reference to the drawings. Note that, for convenience, members having functions identical to those of the respective members described in Embodiment 1 are given respective identical reference signs, and a description of those members is omitted here.

Figure 4:
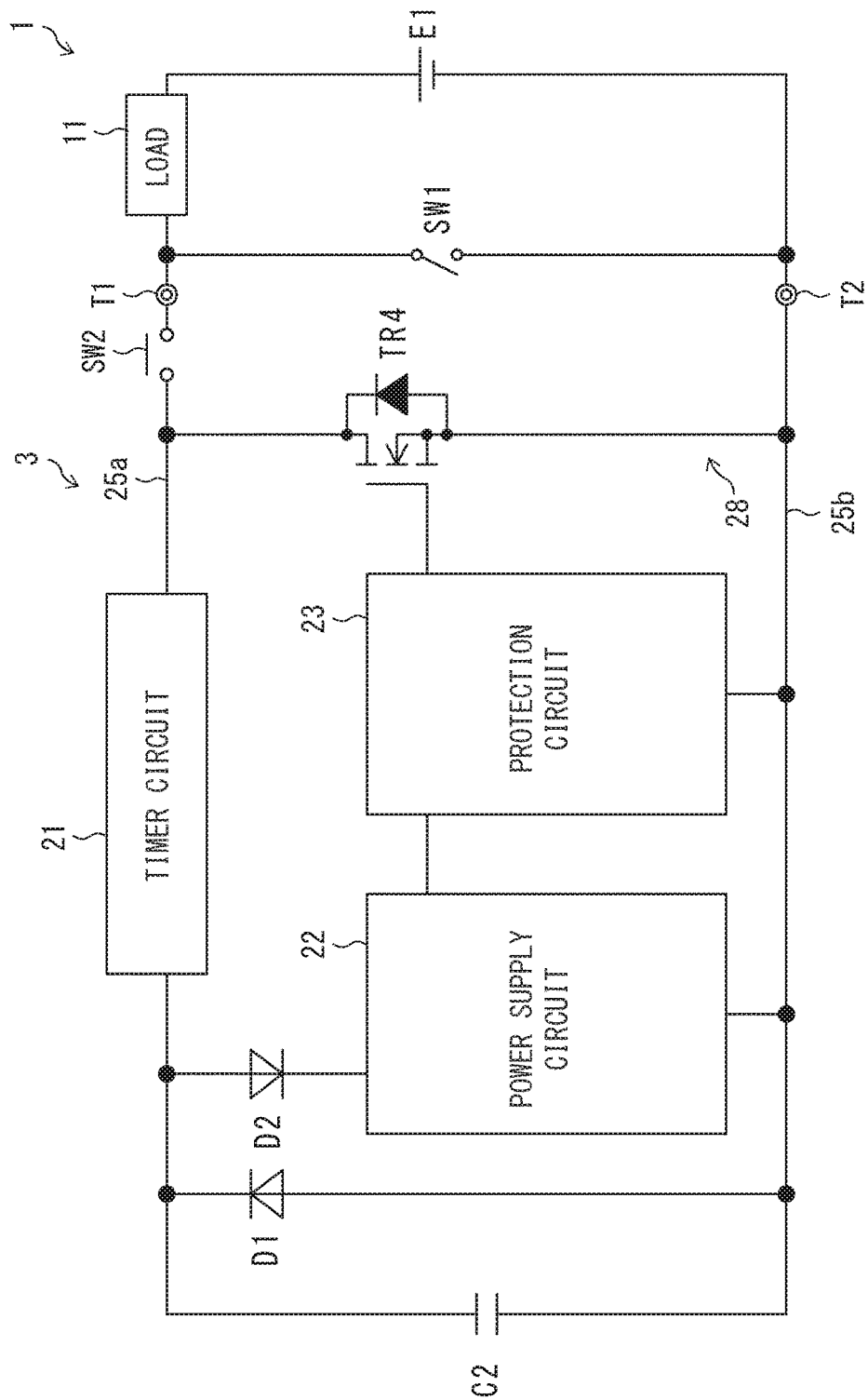
FIG. 4 is a block diagram illustrating a state in which an arc quenching device of another embodiment of the present invention is connected to a load device.
Figure 5:
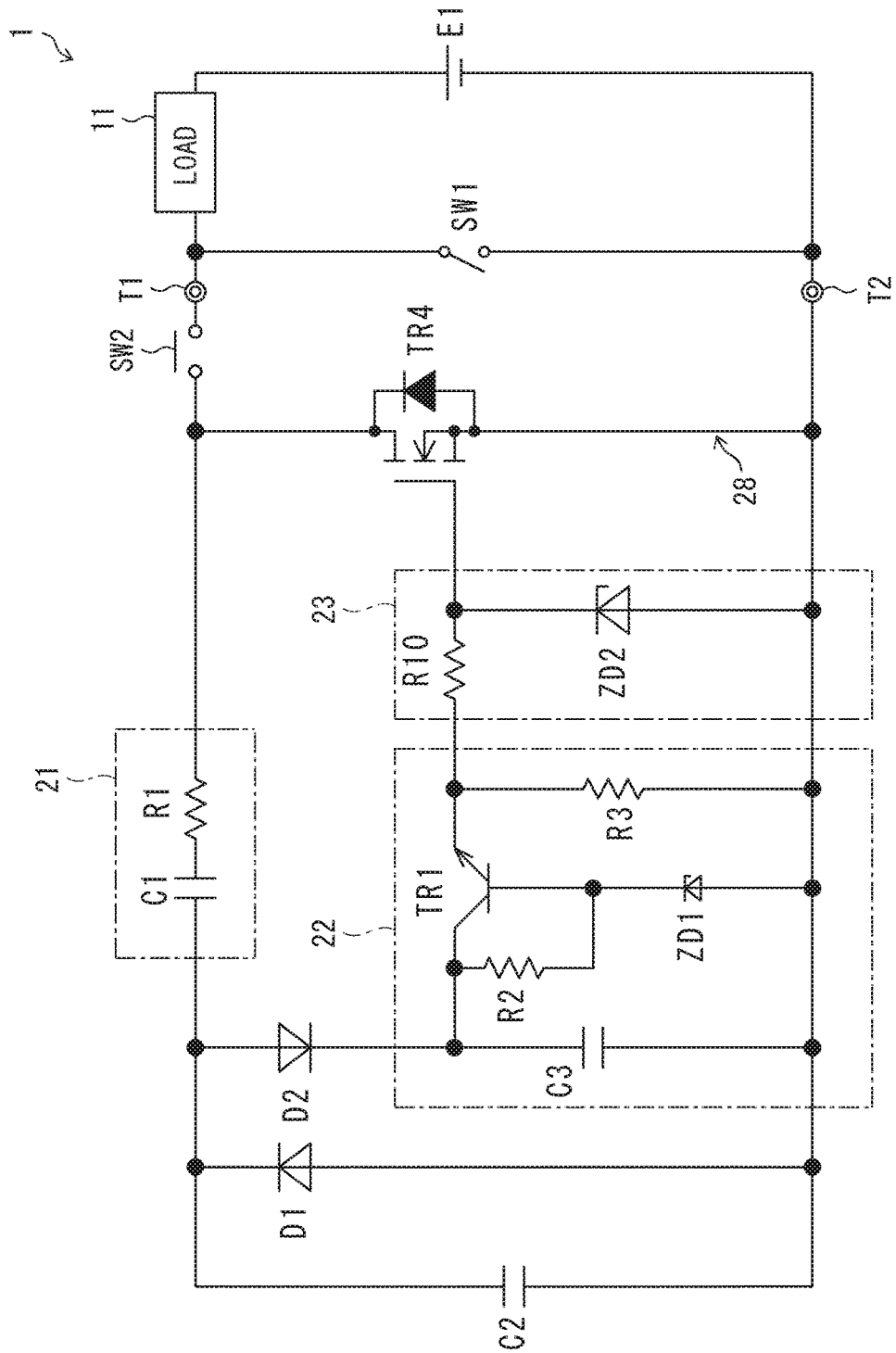
FIG. 5 is a circuit diagram of the load device and the arc quenching device each illustrated in FIG. 4.

FIG. 4 is a block diagram illustrating a state in which an arc quenching device of Embodiment 2 is connected to a load device. FIG. 5 is a circuit diagram of the load device and the arc quenching device each illustrated in FIG. 4.

According to an arc quenching device 3 of Embodiment 2, a second switch SW2 is provided at a location (1) between (a) a connection, located on a first electrically conducted path 25a (a bypass circuit 28), between a semiconductor switch TR4 and the first electrically conducted path 25a and (b) a positive side connection terminal T1. Note that the location (1) at which the second switch SW2 is provided can be replaced with a location (2) between (a) a connection, located on a second electrically conducted path 25b (the bypass circuit 28), between the semiconductor switch TR4 and the second electrically conducted path 25b and (b) a negative side connection terminal T2.

The second switch SW2 which is provided at the location (1) or the location (2) causes the arc quenching device 3 to carry out a basic operation which is similar to that carried out by the arc quenching device 2 described earlier. Note, however, that the second switch SW2 which is provided at the location (1) or the location (2) allows the arc quenching device 3 to have the following advantage.

Specifically, a withstanding voltage test on the second switch SW2 is carried out by applying a voltage of, for example, 1000 V to 2000 V to the second switch SW2. In this case, since an FET, which is the semiconductor switch TR4, has a low withstanding voltage, the second switch SW2 needs to be completely separated from the arc quenching device 3 by separately providing, for example, a switch having a contact point. In order to separate, from the arc quenching device 3, the second switch SW2 which is provided at the location (1) or the location (2), it is possible to provide, only between (a) the connection, located on the first electrically conducted path 25a, between the semiconductor switch TR4 and the first electrically conducted path 25a and (b) the second switch SW2, the above switch for separating the second switch SW2 from the arc quenching device 3. Thus, as compared with a state in which the second switch SW2 is provided at a location illustrated in FIG. 3, a state in which the second switch SW2 is provided at the location (1) or the location (2) makes it easier to separate the second switch SW2.

Furthermore, the second switch SW2 which is in an open state allows the semiconductor switch TR4 to be separated from a load device 1 so as to be insulated. Thus, for example, in a case where a short circuit fault occurs in the semiconductor switch TR4, the second switch SW2 which is in the open state makes it possible to (i) interrupt a path through which an electric current flows to the semiconductor switch TR4 and (ii) protect a circuit of the arc quenching device 3. This allows the arc quenching device 3 to be safer.

(Other Locations of Second Switch SW2)

Note that the second switch SW2 does not necessarily need to be provided at a location illustrated in FIG. 2 or 3 but can be provided at any of the following locations (3) through (7):

(3) between (a) a connection, located on the bypass circuit 28, between the semiconductor switch TR4 and the first electrically conducted path 25a and (b) the semiconductor switch TR4;

(4) between (a) a connection, located on the bypass circuit 28, between the semiconductor switch TR4 and the second electrically conducted path 25b and (b) the semiconductor switch TR4;

(5) between (a) a connection, located on the first electrically conducted path 25a, between a diode D2 and the first electrically conducted path 25a and (b) a first timer circuit 21;

(6) between (a) a connection between a capacitor C3 and the second electrically conducted path 25b and (b) the capacitor C3; and (7) between (a) a connection, located on the second electrically conducted path 25b, between the capacitor C3 and the second electrically conducted path 25b and (b) a connection between a resistor R3 and the second electrically conducted path 25b According to the second switch SW2 which is provided at any of the above locations (1) through (7), in a case where the second switch SW2 is opened, the bypass circuit 28 is interrupted and the semiconductor switch TR4 is prevented from turning on, or a power supply circuit 22 is prevented from operating and the semiconductor switch TR4 is prevented from operating.

The second switch SW2 which is provided at the location (3) or the location (4) allows the semiconductor switch TR4 to be separated from the bypass circuit 28, i.e., the load device 1 so as to be insulated. Thus, for example, in a case where a short circuit fault occurs in the semiconductor switch TR4, as in the case of the second switch SW2 which is provided at the location (1) or the location (2), the second switch SW2 which is provided at the location (3) or the location (4) makes it possible to protect a circuit of the arc quenching device 3 and consequently to make the arc quenching device 3 safer.

Embodiment 3

A further embodiment of the present invention is described below with reference to the drawings. Note that, for convenience, members having functions identical to those of the respective members described in Embodiment 1 and 2 are given respective identical reference signs, and a description of those members is omitted here.

Figure 6:
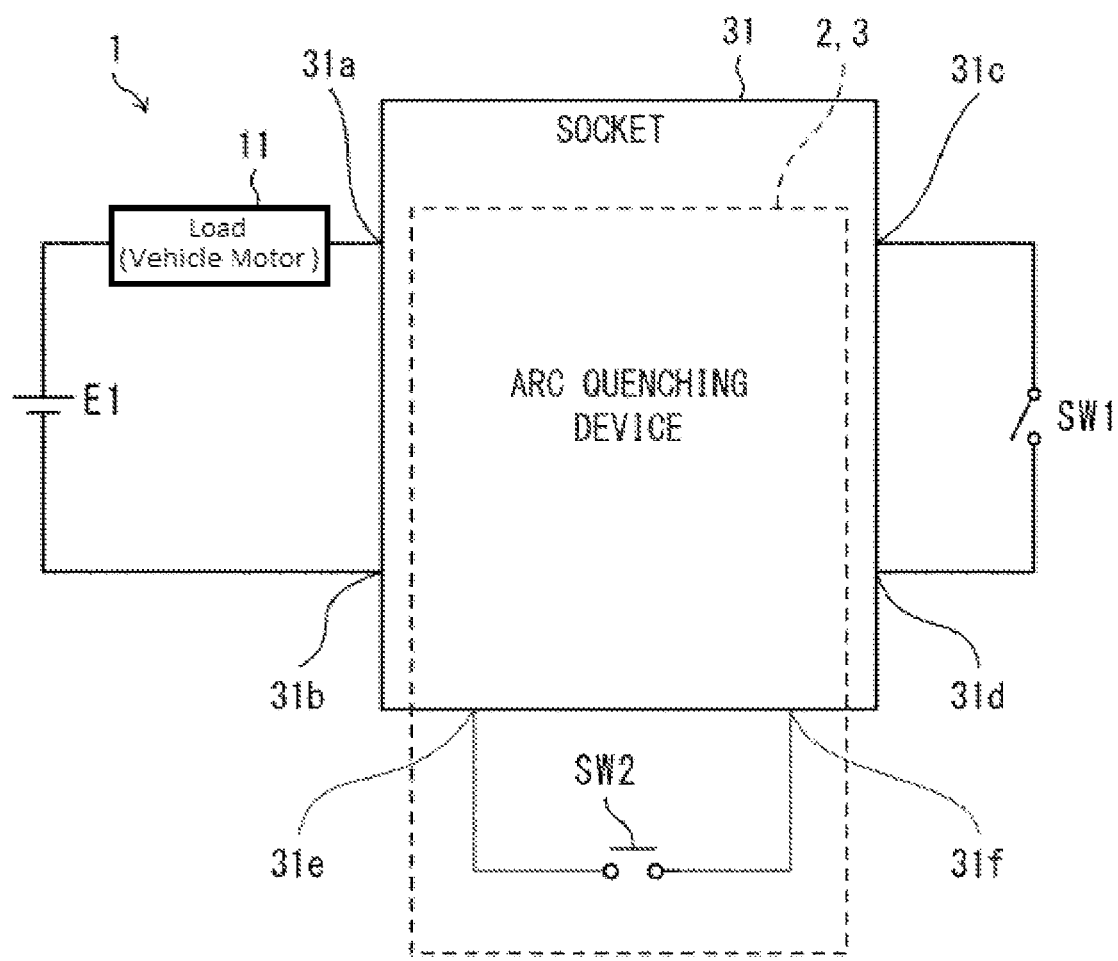
FIG. 6 is a block diagram illustrating a further embodiment of the present invention and showing an example of application of an arc quenching device.

FIG. 6 is a block diagram showing an example of application of an arc quenching device of Embodiment 3. As described earlier, the arc quenching device 2 described in Embodiment 1 and the arc quenching device 3 described in Embodiment 2 are each applicable to a device (e.g., an electric power tool) which has the trigger switch 41 in which the first switch SW1 and the second switch SW2 are incorporated. Other examples of application of the arc quenching device of Embodiment 3 include an arc quenching device 2 or 3 which is incorporated in a socket 31 which is connected to a load 11 (see FIG. 6). In this case, the arc quenching device 2 or 3 is configured in a form of a unit which has a housing.

According to the configuration illustrated in FIG. 6, the load 11 is, for example, an in-vehicle motor, and a first switch SW1 is, for example, a relay which is connected to the socket 31. A second switch SW2 can be provided, as in the case of the first switch SW1, so as to be external to the socket 31. In this case, the socket 31 can include (i) connection terminals 31a and 31b which are connected with the load 11 and a direct current power supply E1, respectively, (ii) connection terminals 31c and 31d each of which is connected with the relay (first switch SW1), and (iii) connection terminals 31e and 31f each of which is connected with the second switch SW2 (e.g., a relay).

With the configuration, the arc quenching device 2 or 3 makes a life of a relay longer by (i) preventing an arc from occurring between contact points of the relay (first switch SW1) or (ii) quenching an arc which has occurred between the contact points of the relay (first switch SW1).

The arc quenching device 2 or 3 is applicable to another industrial device that has a switch.

[Recap]

An arc quenching device in accordance with an aspect of the present invention which arc quenching device is configured to quench an arc which occurs in a direct current switch includes: a semiconductor switch connected in parallel to a first switch which is mechanical and is connected in series to a direct current power supply of a load device; a power supply circuit connected to each of both contact points of the first switch and configured to use a voltage which is generated between the both contact points in response to opening of the first switch to output a voltage which causes the semiconductor switch to turn on; and a second switch configured to cause its open state to prevent the semiconductor switch from turning on.

According to the configuration, the second switch is configured to cause its open state to prevent the semiconductor switch from turning on. Thus, by causing the second switch to be in the open state in a case where the load device is not in use by a user, no pulse electric current flows to the load device via the semiconductor switch also in a case where the user detaches the direct current power supply from the load device (e.g., an electric power tool) and then attaches the direct current power supply to the load device. This (i) prevents the load device from displaying a behavior which is unexpected by the user and (ii) allows the arc quenching device to prevent the load device from displaying an unnecessary behavior during starting of the direct current power supply.

The arc quenching device can be configured such that the second switch is provided on an electrically conducted path which connects the first switch and the power supply circuit and to which the semiconductor switch is connected, the second switch being located between the power supply circuit and a connection between the electrically conducted path and the semiconductor switch.

With the configuration, the electrically conducted path which connects the first switch and the power supply circuit and to which the semiconductor switch is connected is interrupted by the open state of the second switch. Thus, in a case where the first switch is opened, no voltage that is generated between the both contact points is supplied to the power supply circuit, so that the power supply circuit does not operate. This prevents the semiconductor switch from turning on.

Thus, also in a case where a user detaches the direct current power supply from the load device (e.g., an electric power tool) and then attaches the direct current power supply to the load device, no pulse electric current flows to the load device via the semiconductor switch, so that the load device does not display a behavior which is unexpected by the user.

The arc quenching device can be configured such that the second switch is (i) provided between the first switch and the semiconductor switch and (ii) connected in series to each of the first switch and the semiconductor switch.

With the configuration, a bypass circuit with respect to the first switch, the bypass circuit being formed by the semiconductor switch which is connected in parallel to the first switch, is interrupted by the open state of the second switch. Thus, turning-on of the semiconductor switch is prevented also in a case where the first switch is opened, the voltage which is generated between the both contact points is supplied to the power supply circuit, and a voltage which causes the semiconductor switch to turn on is supplied from the power supply circuit.

Thus, also in a case where a user detaches the direct current power supply from the load device (e.g., an electric power tool) and then attaches the direct current power supply to the load device, no pulse electric current flows to the load device via the semiconductor switch, so that the load device does not display a behavior which is unexpected by the user.

Furthermore, the second switch which is in the open state allows the semiconductor switch to be separated from the load device so as to be insulated. Thus, for example, in a case where a short circuit fault occurs in the semiconductor switch, the second switch which is in the open state makes it possible to (i) interrupt a path through which an electric current flows to the semiconductor switch and (ii) protect a circuit of the arc quenching device. This allows the arc quenching device to be safer.

The arc quenching device can be configured such that the second switch is provided on an electrically conducted path which connects the first switch and the power supply circuit and to which the semiconductor switch is connected, the second switch being located between the first switch and a connection between the electrically conducted path and the semiconductor switch.

For example, in a case where a withstanding voltage test on the first switch is carried out by applying a voltage of, for example, 1000 V to 2000 V to the first switch and the semiconductor switch has a low withstanding voltage, the semiconductor switch is separated from the first switch by the second switch. With the configuration, even in a case where the semiconductor switch has a low withstanding voltage, the withstanding voltage test can be carried out by, for example, applying the above voltage to each of both ends of the first switch (with use of, for example, a test probe) without the need to separately provide a switch for separating the semiconductor switch from the first switch.

Furthermore, the second switch which is in the open state allows the semiconductor switch and the power supply circuit to be separated from the load device so as to be insulated. Thus, for example, in a case where a short circuit fault occurs in the semiconductor switch, the second switch which is in the open state makes it possible to (i) interrupt a path through which an electric current flows to the semiconductor switch and (ii) protect a circuit of the arc quenching device. This allows the arc quenching device to be safer.

The arc quenching device can be configured such that the second switch is provided on an electrically conducted path which connects the first switch and the power supply circuit and to which the semiconductor switch is connected, the second switch being located between the semiconductor switch and a connection between the electrically conducted path and the semiconductor switch.

With the configuration, the second switch which is in the open state allows the semiconductor switch to be separated from the load device so as to be insulated. Thus, for example, in a case where a short circuit fault occurs in the semiconductor switch, the second switch which is in the open state makes it possible to (i) interrupt a path through which an electric current flows to the semiconductor switch and (ii) protect a circuit of the arc quenching device. This allows the arc quenching device to be safer.

The arc quenching device can be configured such that the second switch is a normally open switch.

With the configuration, since the second switch is a normally open switch, a behavior of the load device which behavior is unexpected by the user can be prevented without the need for the user to operate the second switch.

The arc quenching device can be configured such that: the first switch and the second switch operate along with an operation section which is operated in the load device; and in accordance with a movement, in one direction, of the operation section which is operated in the load device, the second switch is closed first and then the first switch is closed, whereas in accordance with a movement of the operation section in a direction opposite to the one direction, the first switch is opened first and then the second switch is opened.

With the configuration, an arc which occurs, during closing and opening of the first switch, due to an operation carried out by the user with respect to the operation section can be quenched in the load device which has the operation section. Furthermore, the configuration makes it possible to prevent a behavior, which is unexpected by the user, of the load device in a case where the user who is not operating the operation section detaches the direct current power supply from the load device and then attaches the direct current power supply to the load device.

The arc quenching device can be configured such that: the second switch, together with the first switch, is incorporated in a trigger switch of an electric power tool, which is the load device; and during pushing of the trigger switch, the second switch is closed first and then the first switch is closed, whereas during a reset of the trigger switch, the first switch is opened first and then the second switch is opened.

With the configuration, an arc which occurs, during closing and opening of the first switch, due to an operation carried out by the user with respect to a trigger switch can be quenched in an electric power tool which has the trigger switch. Furthermore, the configuration makes it possible to prevent a behavior, which is unexpected by the user, of the electric power tool in a case where the user who is not operating the trigger switch detaches the direct current power supply from the electric power tool and then attaches the direct current power supply to the electric power tool.

The arc quenching device can be configured such that the arc quenching device has a housing (e.g., a socket), the housing being provided with (a) a connection with which to connect the first switch of the load device and (b) a connection with which to connect each of the direct current power supply of the load device and a load of the load device.

The configuration allows the arc quenching device to hold circuit components in a housing so as to be configured in a form of a unit. This makes it easy to apply the arc quenching device to various load devices.

The arc quenching device can be configured such that the load is an in-vehicle motor, and the first switch is a relay configured to turn on and off the in-vehicle motor.

The configuration allows the arc quenching device to make a life of a relay, which frequently operates, longer by preventing wear from occurring in contact points due to an arc, so that the arc quenching device can be configured to be suitable to be provided in a vehicle.

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST

1 Load device
2-3 Arc quenching device
11 Load
21 First timer circuit
22 Power supply circuit
23 Protection circuit
25a First electrically conducted path
25b Second electrically conducted path
27 Third electrically conducted path
28 Bypass circuit
31 Socket
41 Trigger switch (operation section)
E1 Direct current power supply
T1 Positive side connection terminal
T2 Negative side connection terminal
SW1 First switch (direct current switch)
SW2 Second switch
TR4 Semiconductor switch

The invention claimed is:

1. An arc quenching device configured to quench an arc which occurs in a direct current switch, said arc quenching device comprising:
a semiconductor switch connected in parallel to a first switch which is mechanical and is connected in series to a direct current power supply of a load device, the semiconductor switch being a transistor having a first terminal connected to one end of the first switch and a second terminal connected to the other end of the first switch;
a power supply circuit connected to each of both contact points of the first switch and configured to use a voltage which is generated between the both contact points in response to opening of the first switch to output a voltage which causes the first terminal and the second terminal of the semiconductor switch to be electrically connected to each other; and
a second switch configured to cause its open state to prevent the semiconductor switch from turning on.

2. An arc quenching device configured to quench an arc which occurs in a direct current switch, said arc quenching device comprising:
a semiconductor switch connected in parallel to a first switch which is mechanical and is connected in series to a direct current power supply of a load device;
a power supply circuit connected to each of both contact points of the first switch and configured to use a voltage which is generated between the both contact points in response to opening of the first switch to output a voltage which causes the semiconductor switch to turn on; and
a second switch configured to cause its open state to prevent the semiconductor switch from turning on, wherein
the second switch is provided on an electrically conducted path which connects the first switch and the power supply circuit and to which the semiconductor switch is connected, the second switch being located between the power supply circuit and a connection between the electrically conducted path and the semiconductor switch.

3. An arc quenching device configured to quench an arc which occurs in a direct current switch, said arc quenching device comprising:
a semiconductor switch connected in parallel to a first switch which is mechanical and is connected in series to a direct current power supply of a load device;
a power supply circuit connected to each of both contact points of the first switch and configured to use a voltage which is generated between the both contact points in response to opening of the first switch to output a voltage which causes the semiconductor switch to turn on; and
a second switch configured to cause its open state to prevent the semiconductor switch from turning on, wherein
the second switch is (i) provided between the first switch and the semiconductor switch and (ii) connected in series to each of the first switch and the semiconductor switch.

4. The arc quenching device as set forth in claim 3, wherein the second switch is provided on an electrically conducted path which connects the first switch and the power supply circuit and to which the semiconductor switch is connected, the second switch being located between the first switch and a connection between the electrically conducted path and the semiconductor switch.

5. The arc quenching device as set forth in claim 3, wherein the second switch is provided on an electrically conducted path which connects the first switch and the power supply circuit and to which the semiconductor switch is connected, the second switch being located between the semiconductor switch and a connection between the electrically conducted path and the semiconductor switch.

6. The arc quenching device as set forth in claim 1, wherein the second switch is a normally open switch.

7. An arc quenching device configured to quench an arc which occurs in a direct current switch, said arc quenching device comprising:
a semiconductor switch connected in parallel to a first switch which is mechanical and is connected in series to a direct current power supply of a load device;
a power supply circuit connected to each of both contact points of the first switch and configured to use a voltage which is generated between the both contact points in response to opening of the first switch to output a voltage which causes the semiconductor switch to turn on; wherein:
the second switch is a normally open switch;
the first switch and the second switch operate along with an operation section which is operated in the load device; and
in accordance with a movement, in one direction, of the operation section which is operated in the load device, the second switch is closed first and then the first switch is closed, whereas in accordance with a movement of the operation section in a direction opposite to the one direction, the first switch is opened first and then the second switch is opened.

8. An arc quenching device configured to quench an arc which occurs in a direct current switch, said arc quenching device comprising:
   a semiconductor switch connected in parallel to a first switch which is mechanical and is connected in series to a direct current power supply of a load device;
   a power supply circuit connected to each of both contact points of the first switch and configured to use a voltage which is generated between the both contact points in response to opening of the first switch to output a voltage which causes the semiconductor switch to turn on; and
   a second switch configured to cause its open state to prevent the semiconductor switch from turning on, wherein:
   the second switch is a normally open switch;
   the second switch, together with the first switch, is incorporated in a trigger switch of an electric power tool, which is the load device; and
   during pushing of the trigger switch, the second switch is closed first and then the first switch is closed, whereas during a reset of the trigger switch, the first switch is opened first and then the second switch is opened.

9. An arc quenching device configured to quench an arc which occurs in a direct current switch, said arc quenching device comprising:
   a semiconductor switch connected in parallel to a first switch which is mechanical and is connected in series to a direct current power supply of a load device;
   a power supply circuit connected to each of both contact points of the first switch and configured to use a voltage which is generated between the both contact points in response to opening of the first switch to output a voltage which causes the semiconductor switch to turn on; and
   a second switch configured to cause its open state to prevent the semiconductor switch from turning on, wherein
   the arc quenching device has a housing, the housing being provided with (a) a connection with which to connect the first switch of the load device and (b) a connection with which to connect each of (i) the direct current power supply of the load device and (ii) a load of the load device.

10. The arc quenching device as set forth in claim 9, wherein the load is an in-vehicle motor, and the first switch is a relay configured to turn on and off the in-vehicle motor.

* * * * *